April 22, 1969 H. J. WOLKSTEIN 3,440,555

SHAPED-LOSS ATTENUATOR FOR EQUALIZING THE GAIN OF A TRAVELING WAVE TUBE AMPLIFIER

Filed March 21, 1966

INVENTOR
HERBERT J. WOLKSTEIN

H. H. Losche
ATT'YS

United States Patent Office 3,440,555

Patented Apr. 22, 1969

3,440,555
SHAPED-LOSS ATTENUATOR FOR EQUALIZING THE GAIN OF A TRAVELING WAVE TUBE AMPLIFIER

Herbert J. Wolkstein, Livingston, N.J., assignor, by mesne assignments, to the United States of America, as represented by the Secretary of the Navy Filed Mar. 21, 1966, Ser. No. 537,618
Int. Cl. H03f 3/58, 3/10, 3/12
U.S. Cl. 330—43 3 Claims

ABSTRACT OF THE DISCLOSURE

A shaped-loss attenuator for equalizing the gain of a traveling wave tube amplifier throughout its intended frequency range by reducing or eliminating excessive peaking of the gain in the mid-band region. The invention is comprised of a passive quarter wavelength terminated line having one end directly coupled to the amplifier transmission line and having the length of the terminated line placed in parallel with the transmission line at a distance or spacing therefrom determined by the amount of attenuation desired. The line is terminated at its other end by a suitable resistance such as a lossy wire placed at right angles to the quarter wave line. This gain equalizer may be coupled to the transmission line leading to the traveling wave tube, or it may be incorporated within the envelope of the tube as an integral part thereof.

This invention relates to a shaped-loss attenuator which varies with frequency and more particularly to a device which can level the frequency response of an amplifier so that the amplifier becomes useful over a wider frequency band. This invention is especially adaptable to traveling wave tubes.

BACKGROUND OF THE INVENTION

Traveling wave tubes, and generally all other amplifying devices, are possessed of gain characteristics which peak at mid-band where the interaction efficiency is high. The gain usually falls off at both ends of the band and this fall-off is large when the amplifier covers an appreciable portion of an octave. The large difference in gain across the octave band can present difficulties for many system applications where a flat response is necessary. An example of this is seen when several amplifying tubes are cascaded, since the gain across the band for each amplifier in the chain is additive. If the tubes are being used in a receive-transmit system such as in an active drone, the large difference in gain imposes a severe isolation problem between receiving and transmitting antennas. That is, excessive gain at mid-band beyond the antenna-to-antenna isolation results in system instability and oscillation. Many ways have been proposed to make the gain of a traveling-wave tube more uniform across the band by reducing or eliminating the excessive peaking in the gain at mid-band. Most of the proposed methods, however, require complex circuitry to achieve a flattened frequency response. Alternatively, some methods allow for wide-band use only by manual adjustment.

SUMMARY OF THE INVENTION

This invention is based on the use of a passive quarter wavelength terminated coupler which extracts energy out of the main transmission line, thereby providing the necessary loss with frequency. The quarter wavelength terminated line is connected parallel to, and it is coupled with, the main transmission line for affecting attenuation. The attenuation shape, and frequency response, are functions of the fundamental quarter wavelength for which the device is designed. Operation is then at some odd multiple of this frequency and the degree of attenuation achieved is a function of the coupling and dielectric loading of the quarter wavelength line with respect to the main line. For example, if the attenuator is designed for 1 kilomegacycle (kmc.), then maximum attenuation will occur at 1, 3, 5, and 7 kmc. with very little attenuation at 2, 4, 6, and 8 kmc. Therefore, it is an object of this invention to provide an attenuator which varies with frequency to equalize the gain of an amplifier which normally produces excessive gain at its mid-band.

BRIEF DESCRIPTION OF THE DRAWINGS

Other objects, advantages, and novel features of the invention will become apparent from the following detailed description of the invention when considered in conjunction with the accompanying drawing, in which.

DESCRIPTION OF THE PREFERRED EMBODIMENT

Figure 1:
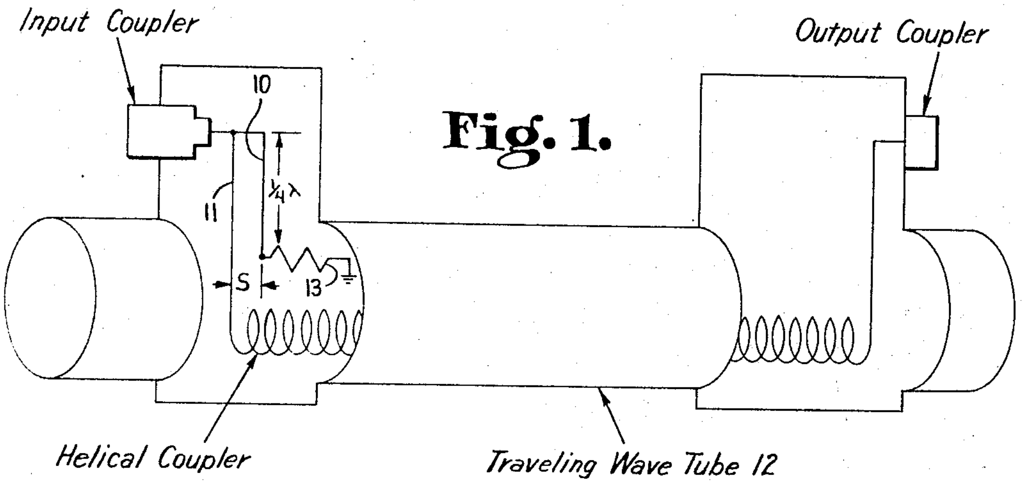
FIGURE 1 illustrates one embodiment of the invention where the quarter wave attenuator line is placed inside a traveling-wave tube and parallel to the input transmission line thereof.

In the embodiment of the invention as shown in FIGURE 1, a wire 10, one-quarter wavelength long, is connected to the main transmission line 11 at the input to a traveling wave tube 12. This wire 10 forms a portion of the attenuator and it is placed parallel to the main line 11 at some distance S. The quarter wave line becomes more closely coupled as S is decreased, and the desired amount of attenuation is attained by adjusting this spacing. It is evident in this configuration that the quarter wave line 10 is straight, but as explained below, many configurations are possible as long as the two lines are kept parallel and the attenuator line 10 is one quarter wavelength long. The quarter wave line must be terminated and this impedance 13 may take the form of a lumped disc or distributed resistance. It has been determined that a lossy wire attached at right angles to the quarter wave line can be used; and, that this wire may be Karma or some equivalent.

The length of the quarter wave line is determined from the following calculations:

$$L=\lambda_m/4$$

where $\lambda_m$ is the wavelength of the medium in which the attenuator is employed.

$$\lambda_m=\frac{\lambda_o}{\sqrt{\epsilon_R}}=\frac{c}{f_o\sqrt{\epsilon_R}}$$

and therefore $$L=\frac{c}{4f_o\sqrt{\epsilon_R}}$$

where $c$ is the velocity of light, $f_o$ is the desgin frequency; and $\epsilon_R$ is the relative permitivity.

Figure 2:
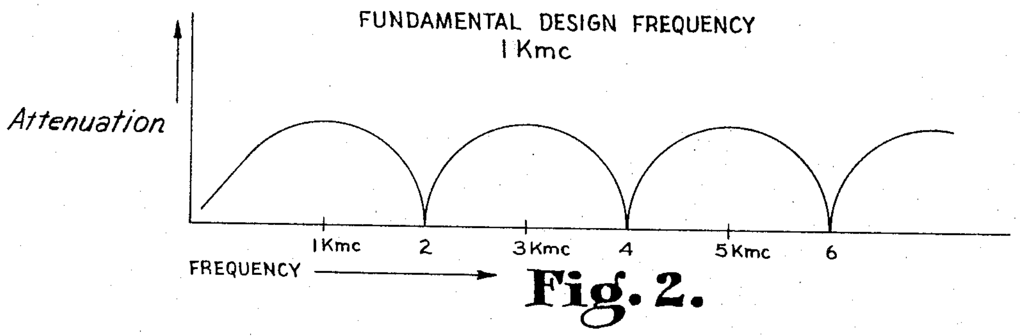
FIGURE 2 shows a curve of the loss charactertistics of a gain equalizer designed with a fundamental frequency of 1 kmc.

FIGURE 2 shows the results of designing for a frequency of 1 kmc. and it is seen that the attenuation is a maximum at odd multiples of 1 kmc.; at 1, 3, and 5 kmc.

Figure 3:
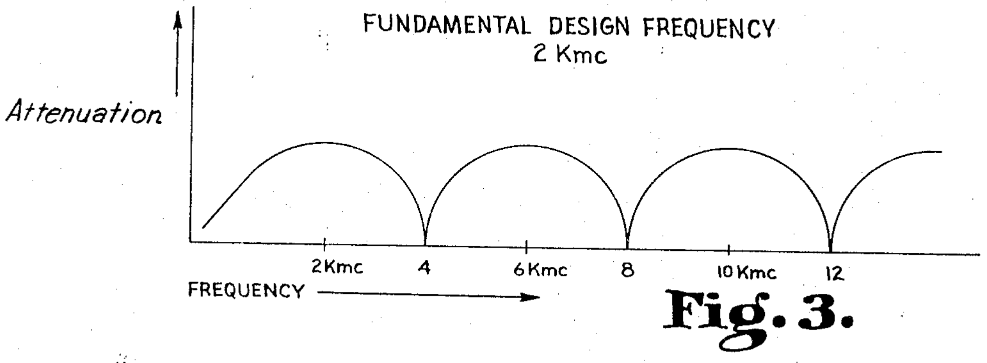
FIGURE 3 shows the loss characteristics of the invention where the design was made using 2 kmc. as the fundamental frequency.

FIGURE 3 shows the attenuation curve for 2 kmc. design. Again, maximum attenuation occurs at odd multiples of the fundamental frequency; at 2, 6, and 10 kmc. It is seen that this design is useful over a complete octave.

Figure 4:
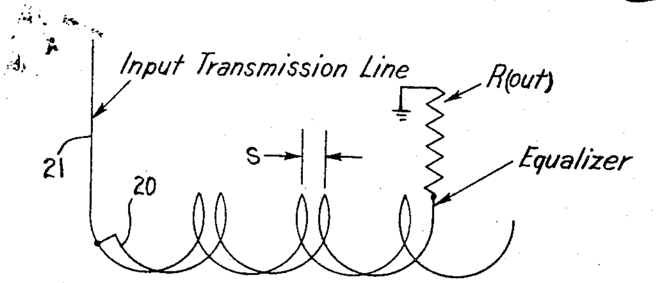
FIGURE 4 illustrates a second embodiment of the invention where the quarter wave line is wound parallel to the input helix of a traveling-wave tube.

FIGURE 4 shows another embodiment of the invention where the length of quarter wave line 20 is wound in a bifilar manner with the helical coupler 21 of a traveling wave tube. The attenuator line 20 must be kept parallel to the helix 21 and, as in the embodiment shown in FIGURE 1, the degree of attenuation will depend on the the separation between the two lines, while the length of the quarter wave attenuator line is determined by the above equations.

I claim:

1. A gain equalizer to be used in conjunction with an amplifier, for leveling the amplifier gain curve, wherein the center frequency of the amplifier is equal to some odd multiple of the fundamental design frequency of the gain equalizer, comprising:

a conductor having a length equal to one-fourth the wavelength of the fundamental design frequency of the equalizer, said conductor being placed in close proximity to an unshielded portion of the amplifier transmission line and parallel thereto and having one end thereof directly coupled to said unshielded portion of the amplifier transmission line, to provide inductive coupling between said conductor and said transmission line whereby the amount of attenuation produced by said gain equalizer is dependent upon the distance between said quarter wavelength conductor and the amplifier transmission line; and a terminating resistor means coupled between the other end of said conductor and ground potential.

2. A gain equalizer to be used in conjunction with an amplifier, for leveling the amplifier gain curve, wherein the center frequency of the amplifier is equal to some odd multiple of the fundamental design frequency of the gain equalizer, as described in claim 1, wherein said amplifier is a traveling wave tube having an input transmission line and said quarter wavelength conductor is placed in parallel to said input transmission line of said traveling wave tube.

3. A gain equalizer to be used in conjunction with an amplifier, for leveling the amplifier gain curve, wherein the center frequency of the amplifier is equal to some odd multiple of the fundamental design frequency of the gain equalizer, as described in claim 1, wherein:

said amplifier is a traveling wave tube and said quarter wavelength conductor is wound in a bifilar manner with the helical coupler of said traveling wave tube.

References Cited

UNITED STATES PATENTS

| | | | |
|---|---|---|---|
| 2,736,863 | 2/1956 | Gent et al. | 333—9 |
| 2,806,975 | 9/1957 | Johnson | 315—3.6 |
| 2,849,651 | 8/1958 | Robertson | 315—3.5 X |
| 3,223,948 | 12/1965 | Bowman | 333—9 |

NATHAN KAUFMAN, *Primary Examiner.*

U.S. Cl. X.R.

330—63; 315—39.3, 3.5